US007162444B1

(12) United States Patent
Machado, Jr. et al.

(10) Patent No.: US 7,162,444 B1
(45) Date of Patent: Jan. 9, 2007

(54) METHOD, SYSTEM AND COMPUTER PROGRAM PRODUCT FOR VALUATING NATURAL GAS CONTRACTS USING WEATHER-BASED METRICS

(75) Inventors: Roberto C. Machado, Jr., Wilimington, DE (US); Paul M. Corby, Malvern, PA (US); Bruce Frech, Exton, PA (US)

(73) Assignee: Planalytics, Inc., Wayne, PA (US)

( * ) Notice: Subject to any disclaimer, the term of this patent is extended or adjusted under 35 U.S.C. 154(b) by 1020 days.

(21) Appl. No.: 09/641,394

(22) Filed: Aug. 18, 2000

(51) Int. Cl.
*G06F 17/60* (2006.01)

(52) U.S. Cl. .............................. 705/35; 705/36; 705/37; 705/1

(58) Field of Classification Search ................. 705/35, 705/1, 36, 37
See application file for complete search history.

(56) References Cited

U.S. PATENT DOCUMENTS

| | | | |
|---|---|---|---|
| 3,808,410 A | 4/1974 | Schlesinger ................. 235/156 |
| 4,015,366 A | 4/1977 | Hall, III ........................... 47/1 |
| 4,040,629 A | 8/1977 | Kelly .......................... 273/278 |
| 4,218,755 A | 8/1980 | Root ........................... 364/900 |
| 4,766,539 A | 8/1988 | Fox ............................. 364/401 |
| 4,784,150 A | 11/1988 | Voorhies et al. ............. 128/664 |
| 5,063,506 A | 11/1991 | Brockwell et al. ........... 364/402 |
| 5,128,861 A | 7/1992 | Kagami et al. .............. 364/403 |
| 5,128,862 A | 7/1992 | Mueller ....................... 364/405 |
| 5,130,925 A | 7/1992 | Janes et al. ................. 364/420 |
| 5,140,523 A | 8/1992 | Frankel et al. .............. 364/420 |
| 5,168,445 A | 12/1992 | Kawashima et al. ........ 364/403 |
| 5,189,606 A | 2/1993 | Burns et al. ................ 364/401 |
| 5,208,665 A | 5/1993 | McCalley et al. ............ 358/86 |
| 5,237,496 A | 8/1993 | Kagami et al. .............. 364/401 |
| 5,250,941 A | 10/1993 | McGregor et al. ..... 340/825.65 |
| 5,253,165 A | 10/1993 | Leiseca et al. .............. 364/407 |
| 5,283,865 A | 2/1994 | Johnson ....................... 395/161 |
| 5,295,064 A | 3/1994 | Malec et al. ................. 364/401 |
| 5,295,069 A | 3/1994 | Hersey et al. ........... 364/419.17 |
| 5,309,355 A | 5/1994 | Lockwood ................... 364/401 |
| 5,377,095 A | 12/1994 | Maeda et al. ............... 364/401 |
| 5,491,629 A | 2/1996 | Fox et al. ...................... 364/20 |
| 5,521,813 A | 5/1996 | Fox et al. .................... 364/401 |
| 5,796,932 A | 8/1998 | Fox et al. .................... 395/161 |
| 5,832,456 A | 11/1998 | Fox et al. ...................... 705/10 |
| 6,021,402 A * | 2/2000 | Takriti ......................... 705/412 |

(Continued)

FOREIGN PATENT DOCUMENTS

JP            01-236396       9/1989

(Continued)

OTHER PUBLICATIONS

Turvey, Calum G.; Weather Derivatives and Specific Event Risk, Aug. 1999, pp. 1-11.*

(Continued)

*Primary Examiner*—James P. Trammell
*Assistant Examiner*—John M Winter
(74) *Attorney, Agent, or Firm*—Sterne, Kessler, Goldstein & Fox P.L.L.C.

(57) ABSTRACT

A method, system and computer program product for valuating natural gas futures and options contracts using weather-based metrics. The method and computer program product allow gas buyers and traders to make informed decision on purchasing/selling natural gas futures and futures options on a regulated exchange such as the New York Mercantile Exchange (NYMEX) based on historical and forecasted weather. The system includes weather forecast, weather history, and natural gas-related databases, as well as a trading server and several workstation clients, and provides assistance to traders in reaching complex buying/hedging decisions.

6 Claims, 9 Drawing Sheets

U.S. PATENT DOCUMENTS

| | | | |
|---|---|---|---|
| 6,418,417 B1 * | 7/2002 | Corby et al. | 705/35 |
| 6,584,447 B1 | 6/2003 | Fox et al. | 705/10 |

FOREIGN PATENT DOCUMENTS

| | | |
|---|---|---|
| JP | 01-259488 | 10/1989 |
| JP | 02-268396 | 11/1990 |
| JP | 02-299059 | 12/1990 |
| JP | 04-077896 | 3/1992 |
| JP | 04-135271 | 5/1992 |
| JP | 04-353970 | 12/1992 |
| JP | 05-189406 | 7/1993 |
| JP | 06-076161 | 3/1994 |
| JP | 06-149833 | 5/1994 |

OTHER PUBLICATIONS

Natural Gas Trends, Jul. 28, 2003, Williams, Michael.*

Banham, R., "Reinsurers Seek Relief in Computer Predictions", Aug. 1993, pp. 14-16, 18-19, XP002082269, p. 14, col. 1, line 1, col. 2, line 29.

Best, D.L. and Pryor, S.P., *Air Weather Service Model Output Statistics System Project Report*, United States Air Force, Entire Report submitted (Oct. 1983).

Brennan, P.J., "Portfolio Managers Weather Global Risk Management Challenge," *Wall Street Computer Review*, Dealer's Digest, pp. 20-22, 24, 54 and 56 (Oct. 1989).

Cave, T., "Weather Services is A Boon To System Dispatchers," *Transmission & Distribution*, Intertec, pp. 165-166 and 168-169 (Aug. 1991).

*Demand Modeling & Forecasting System Product Description*, Printed from DIALOG File No. 256, 1 page (Aug. 1984—Product Release Date).

*Down to Earth Sales Analysis 3.1 Product Description*, Printed from DIALOG File No. 256, 1 page (Apr. 1989—Product Release Date).

Ehrenberg, A.S.C. et al., "The After-Effects of Price-Related Consumer Promotion", *Journal of Advertising Research*, Advertising Research Foundation, vol. 34, No. 4, pp. 11-21 (Jul./Aug. 1994).

Engle, R.F. et al., "Modelling Peak Electricity Demand", *Journal of Forecasting*, John Wiley & Sons, vol. 11, No. 3, pp. 241-251 (Apr. 1992).

Gotschall, Mary G., "Bullish on weather," *Electric Perspectives*, Washington, vol. 23, No. 5, p. 30, 8 pgs (Sep./Oct. 1998).

Hunter, R., "Forecast for Weather Derivatives: Hot Derivatives Strategy," May 1999, pp. 1-6, XP002133864, as printed from http://derivatives.com/magazine/arrive/1998/0598feal.asp> p. 1, line 1-p. 6, line 9.

Hurrell, M., "The Weather Business," *Intercity*, pp. 29, 31 and 32 (Feb. 1991).

*IMREX Demand Forecasting System Product Description*, Printed from DIALOG File No. 256. 1 page (1984—Product Release Date).

Jensen, C, and Anderson, L. *Harvard Graphics: The Complete Reference*, Osborne McGraw-Hill, pp. 5, 16, 17, 126-129 and 737-747 (1990).

Lucchetti, A., "Cold Winter On the Way? Some bet on it," *Wall Street Journal*, Nov. 6, 1997.

Malliaris, M., "Beating the Best: A Neutral Network Challenges the Black-Scholes Formula," *Proceedings of the Conference on Artificial Intelligence for Applications*, US, Los Alamitos, IEEE Comp. Soc. Press, 1993, pp. 445-449, XP000379639, ISBN: 0-8186-3840-0, p. 445, col., 1, line 16, p. 446, col. 1, line 17.

*Microsoft Access User's Guide*, Microsoft Corporation, pp. 22-27, 36-39, 326-335, 370-372 and 395-447 (1992).

*Microsoft Excel User's Guide*, Microsoft Corporation, pp. 280-281, 596-601 and 706-709 (1993).

Mitchell, R. et al., "Where No Computer Has Gone Before: Massively Parallel Processing Promises Unparalleled Performance," *Business Week*, McGraw-Hill, pp. 80-84 and 88 (Nov. 25, 1991).

"Origins of Option Pricing Techniques," "The Black and Scholes Model," "The Black and Scholes Model," and "Graphs of the Black Scholes Model," as printed from http://bradley.bradley.edu/.about.arr/bsm, Apr. 9, 1997, (8 pages).

Schwartz, S., "Modeling tools aid in finacial risk management," *Insurance & Technology*, vol. 21, No. 4, pp. 20-21 (Apr. 1996).

Stix, G., "A Calculus of Risk," *Scientific American*, pp. 92-97 (May 1998).

Studwell, A., "Weather Derivatives," *11th Conference on Applied Climatology*, Jan. 10-15, 1999, pp. 36-40, XP00089822, p. 36, col. 1, line 1-p. 40, col. 1, line 33.

*The Weather Initiative*, (Brochure), The Met Office, 23 pages (1990).

Turvey, C. G., "Weather Derivatives and Specific Event Risk,", Aug., 1999, pp. 1-11, XP002133865, as printed from http://agecon.lib.umn.edu/aaea99/sp99/tu02.pdf>, p. 2, line 1, p. 8, line 2.

Turvey, Calum, "Weather Derivatives for Specific Event Risks in Agriculture," *Review of Agricultural Economics*, American Agricultural Economics Associaton, vol. 23, No. 2, pp. 333-351 (Spring/Summer 2001).

Upbin, B., "Betting against God," *Forbes*, vol. 162, No. 1, p. 108(1) (Jul. 6, 1998).

English-language Abstract of Japanese Patent Publication No. 01-238396, from http://www1.ipdl.jpo.go.jp, 1 Page (Sep. 21, 1989—Date of publication of application).

English-language Abstract of Japanese Patent Publication No. 01-259488, from http://www1.ipdl.jpo.go.jp, 1 Page (Oct. 17, 1989—Date of publication of application).

English-language Abstract of Japanese Patent Publication No. 02-268396, from http://www1.ipdl.jpo.go.jp, 1 Page (Nov. 2, 1990—Date of publication of application).

English-language Abstract of Japanese Patent Publication No. 02-299059, from http://www1.ipdl.jpo.go.jp, 1 Page (Dec. 11, 1990—Date of publication of application).

English-language Abstract of Japanese Patent Publication No. 04-077896, from http://www1.ipdl.jpo.go.jp, 1 Page (Mar. 11, 1992—Date of publication of application).

English-language Abstract of Japanese Patent Publication No. 04-135271, from http://www1.ipdl.jpo.go.jp, 1 Page (May 8, 1992—Date of publication of application).

English-language Abstract of Japanese Patent Publication No. 04-353970, from http://www1.ipdl.jpo.go.jp, 1 Page (Dec. 8, 1992—Date of publication of application).

English-language Abstract of Japanese Patent Publication No. 05-189406, from http://www1.ipdl.jpo.go.jp, 1 Page (Jul. 30, 1993—Date of publication of application).

English-language Abstract of Japanese Patent Publication No. 06-076161, from http://www1.ipdl.jpo.go.jp, 1 Page (Mar. 18, 1994—Date of publication of application).

English-language Abstract of Japanese Patent Publication No. 06-149833, from http://www1.ipdl.jpo.go.jp, 1 Page (May 31, 1994—Date of publication of application).

Copy of International Search Report from PCT Appl. No. PCT/US99/23452, 5 pages, mailed Jun. 4, 2000.

* cited by examiner

WEATHER HISTORY 108

| YEAR | MA | DATA TYPE | P1 | P2 | P3 | P4 | P5 | P6 |
|---|---|---|---|---|---|---|---|---|
| 1994 | MSA 100 | TEMP.SEA | 46 | 47 | 50 | 51 | 54 | 55 |
| 1995 | MSA 100 | TEMP.SEA | 46 | 47 | 49 | 51 | 53 | 55 |
| 1994 | MSA 100 | SNOW.SEA | 0.7 | 0.2 | 0.2 | 0.1 | 0 | 0.1 |
| 1995 | MSA 100 | SNOW.SEA | 0.8 | 0.2 | 0.2 | 0.1 | 0 | 0 |
| 1994 | MSA 100 | PREC.SEA | 1.01 | 1.03 | 1.08 | 1.1 | 1.12 | 1.1 |
| 1995 | MSA 100 | PREC.SEA | 1.01 | 1.03 | 1.07 | 1.1 | 1.12 | 1.1 |
| 1994 | MSA 100 | SNOW | 0 | 0 | 0 | 0 | 1.2 | 0 |
| 1995 | MSA 100 | SNOW | 0 | 0 | 0 | 0 | 0 | 0 |
| 1994 | MSA 100 | PREC | 1.5 | 0.4 | 0.9 | 1.3 | 1.7 | 0.3 |
| 1995 | MSA 100 | PREC | 1.1 | 0.01 | 2.68 | 1.78 | 0.48 | 0.01 |
| 1994 | MSA 100 | TEMP | 49 | 43 | 45 | 47 | 50 | 42 |
| 1995 | MSA 100 | TEMP | 53 | 51 | 56 | 50 | 58 | 54 |
| 1994 | MSA 100 | TEMP.CAT | 1 | −1 | −1 | −1 | −1 | −1 |
| 1995 | MSA 100 | TEMP.CAT | 1 | −1 | −1 | 0 | −1 | −1 |
| 1994 | MSA 100 | PREC.CAT | 1 | −1 | −1 | −1 | −1 | −1 |
| 1995 | MSA 100 | PREC.CAT | 1 | −1 | −1 | 1 | −1 | −1 |

FIG.2

| YEAR | MA | DATA TYPE | P1 | P2 | P3 | P4 | P5 | P6 |
|---|---|---|---|---|---|---|---|---|
| N+1 | MSA 100 | SNOW | 0.9 | 0.4 | 0.3 | 0.2 | 1 | 0 |
| N+1 | MSA 100 | PREC | 1.1 | 1.05 | 1.02 | 1.00 | 1.15 | 1.2 |
| N+1 | MSA 100 | TEMP | 48 | 49 | 50 | 53 | 55 | 57 |
| N+1 | MSA 100 | TEMP.CAT | -1 | -1 | -1 | -1 | -1 | -1 |
| N+1 | MSA 100 | PREC.CAT | -1 | -1 | -1 | -1 | -1 | -1 |
| N+1 | MSA 100 | SNOW.SEA | 0.8 | 0.4 | 0.3 | 0.1 | 0 | 0 |
| N+1 | MSA 100 | PREC.SEA | 1.00 | 1.03 | 1.06 | 1.05 | 1.10 | 1.1 |
| N+1 | MSA 100 | TEMP.SEA | 47 | 47 | 49 | 52 | 54 | 55 |

302 304 ⟶ WEATHER FORECAST DATA 106

FIG. 3

| GAS BUYER | | | | | | | | CONTRACTS | | | | | |
|---|---|---|---|---|---|---|---|---|---|---|---|---|---|
| DAYS LEFT | MONTH | FUTURES CURRENT | CHANGE | VOLATIL | TODAY'S DATE RECOMMEND | # | OPTION PREMIUM | GOAL | TO DATE | FUTURES | INDEX | CALL | PUT |
| 15 | MAR-99 | 1.775 | -0.062 | 55% | STRONG FUTURES | 4 | 0 | 200 | 155 | 60 | 95 | 0 | 0 |
| 46 | APR-99 | 1.815 | -0.051 | 44% | STRONG FUTURES | 5 | 0 | 300 | 123 | 55 | 65 | 3 | 0 |
| 76 | MAY-99 | 1.852 | -0.039 | 37% | STRONG FUTURES | 4 | 0 | 400 | 159 | 50 | 100 | 9 | 0 |
| 107 | JUN-99 | 1.880 | -0.031 | 34% | STRONG FUTURES | 3 | 0 | 400 | 139 | 40 | 90 | 9 | 0 |
| 137 | JUL-99 | 1.910 | -0.021 | 32% | FUTURES | 3 | 0 | 400 | 92 | 40 | 52 | 0 | 0 |
| 168 | AUG-99 | 1.935 | -0.020 | 33% | CALL 1.90 | 3 | 0.044 | 400 | 73 | 25 | 33 | 15 | 0 |
| 199 | SEP-99 | 1.960 | -0.018 | 32% | CALL 1.95 | 3 | 0.032 | 400 | 34 | 22 | 0 | 12 | 0 |
| 229 | OCT-99 | 2.011 | -0.012 | 33% | CALL 2.00 | 2 | 0.034 | 400 | 51 | 15 | 20 | 10 | 6 |
| 260 | NOV-99 | 2.171 | -0.017 | 32% | FUTURES | 2 | 0 | 400 | 55 | 35 | 20 | 0 | 0 |
| 290 | DEC-99 | 2.338 | -0.013 | 32% | PUT 2.35 | 2 | 0.042 | 400 | 37 | 0 | 25 | 0 | 12 |
| 321 | JAN-00 | 2.403 | -0.012 | 32% | STRONG INDEX/SELL | 2 | 0 | 400 | 35 | 0 | 35 | 0 | 0 |
| 352 | FEB-00 | 2.325 | -0.010 | 32% | INDEX/SELL | 2 | 0 | 400 | 22 | 0 | 22 | 0 | 0 |

FIG.5

| DATE | PRODUCING REGION | CONSUMING EAST REGION | CONSUMING WEST REGION | TOTAL |
|---|---|---|---|---|
| 07-JAN-94 | 580 | 1260 | 363 | 2203 |
| 14-JAN-94 | 540 | 1125 | 348 | 2013 |
| 21-JAN-94 | 464 | 962 | 334 | 1760 |
| 28-JAN-94 | 430 | 874 | 321 | 1624 |
| 04-FEB-94 | 375 | 750 | 296 | 1421 |
| 11-FEB-94 | 335 | 636 | 276 | 1247 |
| 18-FEB-94 | 312 | 568 | 258 | 1138 |

| DATE | JAN-95 | | | FEB-95 | | | ... | DEC-95 | | |
|---|---|---|---|---|---|---|---|---|---|---|
| | HIGH | LOW | CLOSE | HIGH | LOW | CLOSE | | HIGH | LOW | CLOSE |
| 12/1/1994 | 1.720 | 1.650 | 1.653 | 1.760 | 1.690 | 1.694 | | 1.975 | 1.944 | 1.939 |
| 12/2/1994 | 1.690 | 1.620 | 1.635 | 1.730 | 1.660 | 1.678 | | 1.965 | 1.950 | 1.943 |
| 12/5/1994 | 1.735 | 1.620 | 1.728 | 1.745 | 1.670 | 1.744 | | 1.980 | 1.960 | 1.980 |
| 12/6/1994 | 1.768 | 1.680 | 1.691 | 1.775 | 1.705 | 1.715 | | 1.995 | 1.975 | 1.979 |
| 12/7/1994 | 1.790 | 1.686 | 1.784 | 1.800 | 1.711 | 1.794 | | 2.045 | 1.985 | 2.050 |
| 12/8/1994 | 1.865 | 1.756 | 1.847 | 1.870 | 1.790 | 1.861 | | 2.070 | 2.050 | 2.051 |
| 12/9/1994 | 1.890 | 1.805 | 1.842 | 1.895 | 1.830 | 1.867 | | 2.055 | 2.020 | 2.041 |
| 12/12/1994 | 1.940 | 1.870 | 1.913 | 1.960 | 1.880 | 1.924 | | 2.050 | 2.030 | 2.028 |
| 12/13/1994 | 1.920 | 1.765 | 1.768 | 1.930 | 1.824 | 1.824 | | 2.008 | 1.958 | 1.959 |
| 12/14/1994 | 1.770 | 1.690 | 1.714 | 1.800 | 1.710 | 1.728 | | 1.965 | 1.955 | 1.957 |
| 12/15/1994 | 1.740 | 1.680 | 1.718 | 1.740 | 1.700 | 1.721 | | 1.980 | 1.955 | 1.962 |

METHOD, SYSTEM AND COMPUTER PROGRAM PRODUCT FOR VALUATING NATURAL GAS CONTRACTS USING WEATHER-BASED METRICS

CROSS-REFERENCE TO OTHER APPLICATIONS

The following applications of common assignee are related to the present application and are each hereby incorporated herein by reference in their entirety:

"System, Method, and Computer Program Product for Valuating Weather-Based Financial Instruments," Ser. No. 09/168,276, filed Oct. 8, 1998, now U.S. Pat. No. 6,418,417.

"System and Method for the Advanced Prediction of Weather Impact on Managerial Planning applications," Ser. No. 08/002,847, filed Jan. 15, 1993, now U.S. Pat. No. 5,521,813.

"A User Interface For Graphically Displaying the Impact of Weather on Managerial Planning," Ser. No. 08/504,952, filed Jul. 20, 1995, now U.S. Pat. No. 5,796,932.

"System and Method for Determining the Impact of Weather and Other Factors on Managerial Planning Applications," Ser. No. 08/205,494, filed Mar. 4, 1994, now U.S. Pat. No. 5,491,629.

"System and Method for Weather Adapted, Business Performance Forecasting," Ser. No. 08/588,248, filed Jan. 18, 1996, now U.S. Pat. No. 5,832,456.

BACKGROUND OF THE INVENTION

1. Field of the Invention

The present invention relates generally to financial trading systems and more particularly to the processing, valuating, and trading of financial instruments such as futures and the like.

2. Related Art

In today's financial markets, the use of financial instruments known as futures contracts are common place. Futures contracts are standardized, transferable agreements, which may be exchange-traded, to buy or sell a commodity (e.g., a particular crop, livestock, oil, natural gas, etc.). These contracts typically involve an agreed-upon place and time in the future between two parties. That is, a futures contract is supply contract between a buyer and seller, where the buyer is obligated to take delivery, and the seller is obligated to provide delivery of a fixed amount of a commodity at a predetermined price at a specified location. Futures contracts are typically traded exclusively on regulated exchanges and are settled daily based on their current value in the marketplace.

Another form of financial instruments are option contracts. Options contracts are agreements, that may be exchange-traded, among two parties that represent the right to buy or sell a specified amount of an underlying security (e.g., a stock, bond, futures contract, etc.) at a specified price within a specified time. (In relation to the present discussion, an options contract which specifies gas futures is of most interest.)

The parties of options contracts are purchasers who acquire "rights," and sellers who assume "obligations." Further, a "call" option contract is one giving the owner the right to buy, whereas a "put" option contract is one giving the owner the right to sell the underlying security. There is typically an up-front, non-refundable premium that the buyer pays the seller to obtain the option rights.

Options and futures contracts are explained in detail in John Hull, *Options, Futures, and Other Derivative Securities*, Prentice Hall (3rd. ed. 1997), ISBN 0138874980, which is incorporated herein by reference in its entirety.

Taking the example of a specific commodity—natural gas—traders typically buy and sell natural gas futures on a daily basis on the New York Mercantile Exchange (NYMEX) regulated exchange. What is commonly referred to as "natural gas" is a naturally occurring mixture of hydrocarbon and other gases found in porous rock formations. Its principal component is methane whose molecular formula is $CH_4$. It is estimated that natural gas currently provides about 24 percent of all the energy used in the United States.

Typically, gas traders (i.e., those who buy and sell natural gas futures and options) represent the interests of utility companies and other entities who require a large supply of natural gas in order to provide energy to businesses and homes. In order to assure continuous operations, while minimizing expenses, utility companies and other entities buy and sell (i.e., trade) natural gas futures and options.

Because futures and option contracts (i.e., "gas futures") are essentially financial instruments, they may be traded among investors as are stocks, bonds, and the like. Thus, in order to trade gas futures and options, there must be a mechanism to price them so that traders may exchange them in an open market.

The relationship between the value of a gas future or option and the value of the underlying commodity are not linear and can be very complex. Economists have developed pricing models in order to valuate certain types of futures and options. Further, many strategies exist for utility companies and other entities to predict the demand for energy and thus, the number of contracts needed over a specific period of future time. Each model and strategy has inherent flaws, and thus poses risks.

Risks in relying on any one model or strategy includes errors in the model's underlying assumptions, errors in calculation when using the model, and failure to account for variables (i.e., occurrences) that may affect the price of the underlying commodity (i.e., natural gas). For example, factors such as economics, politics, etc. play a critical role in estimating demand for natural gas.

When considering the latter risk—failure to account for occurrences that may affect price—weather is one occurrence which has been historically been overlooked. That is, weather, and more specifically future weather, has not been included as a formal variable in pricing models.

The few models that have considered weather usually have only considered past (i.e., historical) weather data. Further, strategies based on predicated demand also have only considered historical weather data. That is, most models and strategies assume, for example, that the previous year's weather and its effects on power demand will repeat from year to year. Historical analysis has shown, however, that this assumption is true only a quarter of the time. Thus, regardless of whether futures or options are being evaluated, risk management trading techniques, strategies, or vehicles, traders essentially have been operating in the "blind" without knowledge of future weather conditions.

Therefore, what is needed is a method, system and computer program product for valuating (and thus, processing and trading) natural gas futures and options contracts using weather-based metrics.

SUMMARY OF THE INVENTION

The present invention meets the above-identified needs by providing a method, system and computer program product for valuating (and thus, processing and trading) natural gas futures and options contracts using weather-based metrics. The method, system and computer program product captures the extreme sensitivity to future weather, captures volatile price swings in growing paper markets, and provides assistance to traders in reaching complex buying/hedging decisions.

The method and computer program product involve receiving an input from a user indicative of the number of monthly gas contracts desired for a period of time. Next, historical and future weather information and historical natural gas inventory information for a basket of cities, during the entered period of time, are received. Then, historical gas futures contract price information for the period of time is received.

The method and computer program product then apply a series of regression analyses to obtain a predicted baseline value for each of the monthly gas contracts within the period. This is accomplished by using historical weather information for the basket of cities and historical natural gas inventory information. Then baseline values are calculated using future weather information.

Then, live exchange data which indicates the current price for each of the monthly gas contracts within the period of time is received. The method and computer program product then apply a series of recommendation rules, using the received live exchange data and baseline values, providing the user with a recommendation for each of the monthly gas contracts within the period of time. The users of the system thereby receive assistance in reaching complex buying/hedging decisions.

The system for valuating a weather-based financial instrument of the present invention includes a weather history database that stores historical weather information for at least one geographic location and a weather forecast database that stores future weather information for the geographic location. The system may also include several natural gas-related databases that store information in order to determine buying/hedging strategies. In order to access the databases and valuate financial instruments, a trading server is included within the system. The trading server provides the central processing of the system by applying a pricing model, and is responsive to a plurality of internal and external workstations that allow users, via a graphical user interface, to access the trading system.

One advantage of the present invention is that gas futures and options can be priced more easily and confidently when accounting for future weather.

Another advantage of the present invention is that information and data sets can be provided that enable traders to identify and capitalize on weather-driven market fluctuations.

Another advantage of the present invention is that it provides a trading system which guides traders by providing buy and sell recommendations for various futures and option contracts.

Further features and advantages of the invention as well as the structure and operation of various embodiments of the present invention are described in detail below with reference to the accompanying drawings.

TO BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 2 depicts, in one embodiment, a weather history database used by the present invention;

FIG. 3 depicts, in one embodiment, a weather forecast database used by the present invention;

Figure 4A:
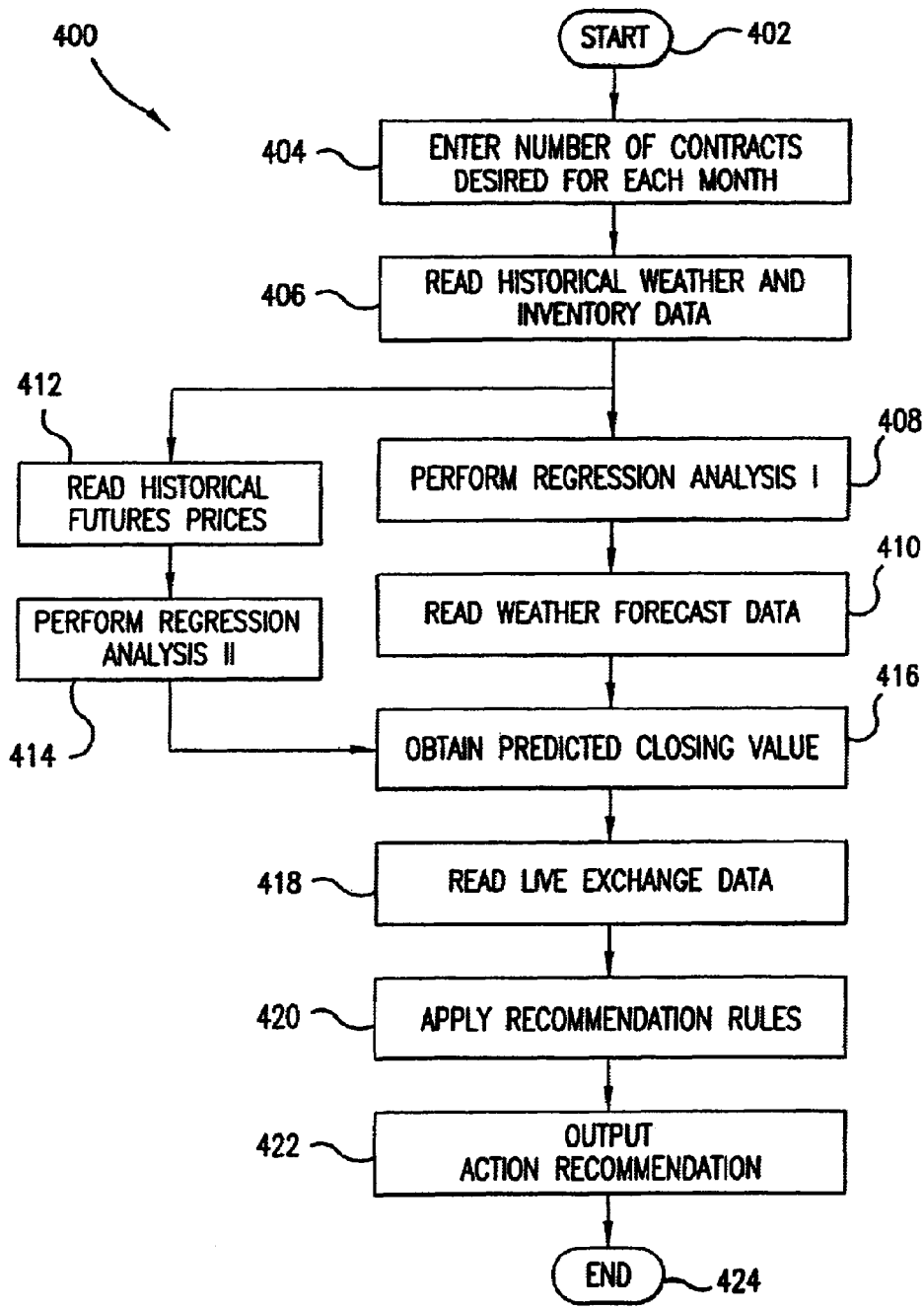
Figure 4B:
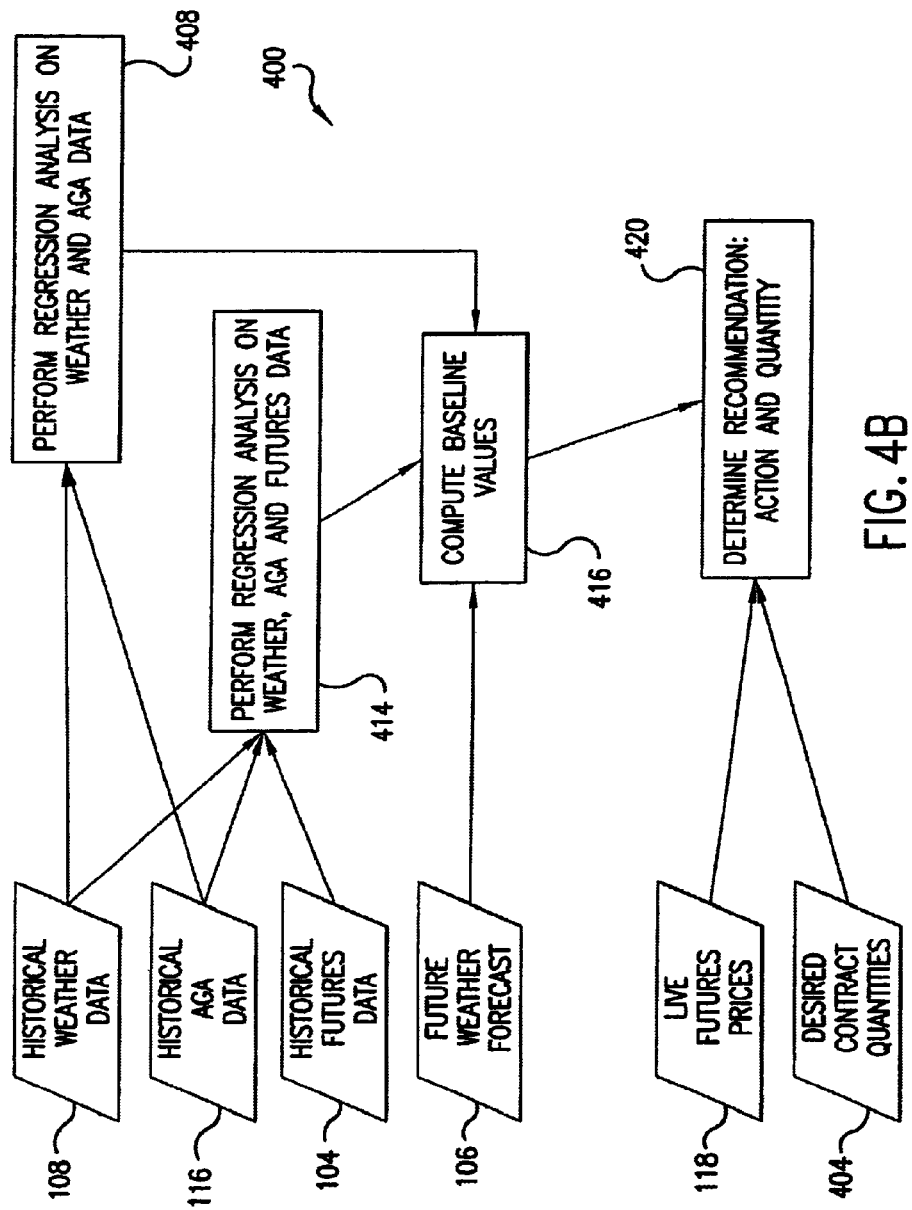
Figure 6:
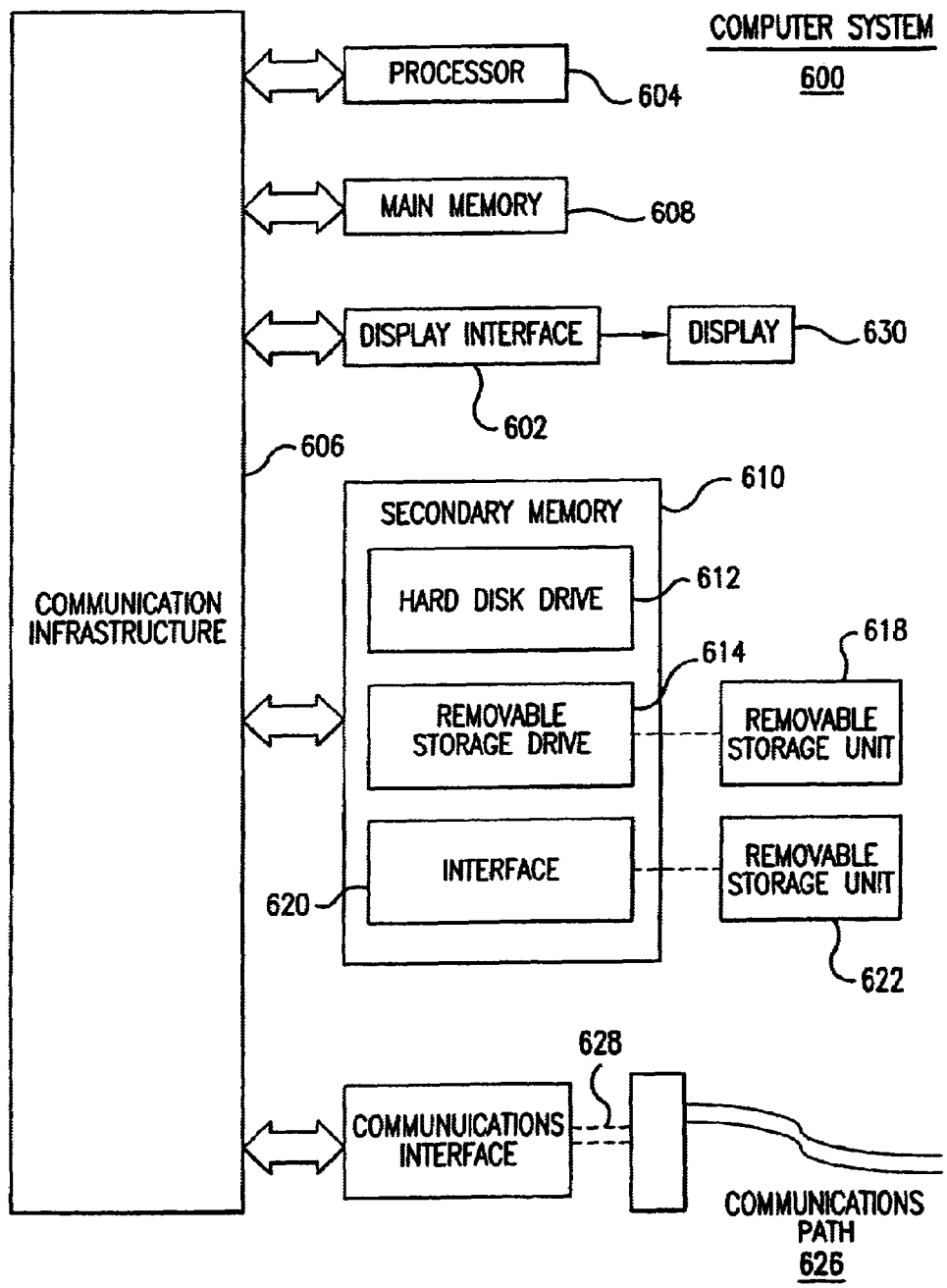

FIGS. 4A–B are flowcharts representing, in one embodiment, the operation of the present invention;

FIG. 5 is an exemplary graphical user interface screen for the trading system of the present invention;

FIG. 6 is a block diagram of an exemplary computer system useful for implementing the present invention; and FIGS. 7–8 depict example gas databases used by the present invention.

DETAILED DESCRIPTION OF THE PREFERRED EMBODIMENTS

TABLE OF CONTENTS

I. Overview
  A. The Present Invention
  B. An Example Natural Gas Futures Contract II. System Architecture
  A. System Architecture Overview
  B. Weather History Database
  C. Weather Forecast Database
  D. Relationship between Past and Future Databases
  E. Time Periods
  F. Gas Databases III. General System Operation IV. Graphical User Interface V. Environment VI. Conclusion I. Overview
  A. The Present Invention The present invention is directed to a method, system and computer program product for valuating (and thus, processing and trading) natural gas futures and options contracts using weather-based metrics. In an embodiment of the present invention, a trading organization provides a service that facilitates gas futures and options trading for clients as well as providing an interactive World-Wide Web site accessible via the global Internet.

Such a system would allow the clients (i.e., gas buyers) who represent the interests of utility companies and large entities such as manufacturers, agribusiness, or other industries with large power demands to intelligently trade and use gas futures and options to hedge against weather-related market risks.

The present invention is described in terms of the above example. This is for convenience only and is not intended to limit the application of the present invention. In fact, after reading the following description, it will be apparent to one skilled in the relevant art how to implement the following invention in alternative embodiments. For example, and without limitation, the present invention would also benefit power marketers, fuel traders, power traders, fuel emissions credit traders, investment banks, insurance and re-insurance companies, capital market traders, commodity traders, and over-the-counter (OTC) traders (i.e., anyone whose business relates to power and whose "bottom-line" is affected by weather). These entities would benefit from the present invention not only by having a tool which enables them to hedge against weather-related market risks, but also to speculate for profit. Further, although NYMEX conventions are referenced herein, the present invention could also be used to reference the month-end Inside-FERC monthly settlement price for a gas futures contract.

B. An Example Gas Futures Contract

The present invention is described below in terms of a gas contract. This is for convenience only and is not intended to limit the application of the present invention. Further, the term "gas contract" is used herein to refer to either a natural gas futures contract, an option on a natural gas futures contract, and/or other gas contracts (e.g., physical) as applicable.

As mentioned above, a futures contract is a supply agreement between a buyer and seller, where the buyer and seller are obligated to provide delivery of a fixed amount of a commodity at a predetermined price at a specified location, or exchange the cash differential of the contract at its expiration. A gas futures contract typically traded on the NYMEX includes the following example terms as shown in TABLE 1 below.

TABLE 1

Seller will deliver:
    10,000 MMBtu of Natural Gas at Henry Hub
Buyer will pay:
    $x per MMBtu
Expiration Date:
    <month>, <year>

In the example, the quantity of natural gas is 10,000 units of one million British thermal units (MMBtu). An MMBtu is the equivalent of one dekatherm, which is approximately equal to a thousand cubic feet ($ft^3$) of natural gas.

The delivery location in the example is specified as "Henry Hub." This is the port of New Orleans, La., and is the standard gas contract delivery location used by NYMEX in their gas futures prices quoting system.

The expiration date, the date and time after which trading in a contract terminates, and after which obligations become due, is specified by a month and a year. Thus, for example, an expiration date of "April, 2001" would indicate, by NYMEX convention, that the contract expires three business days before the end of March, 2001. Such a contract would be called an "April 2001 contract," because delivery of the natural gas is to be actually done in April of 2001 (i.e., an "April 2001 contract" expires in March, three business days before Apr. 1, 2001).

II. System Architecture

A. System Architecture Overview

Figure 1:
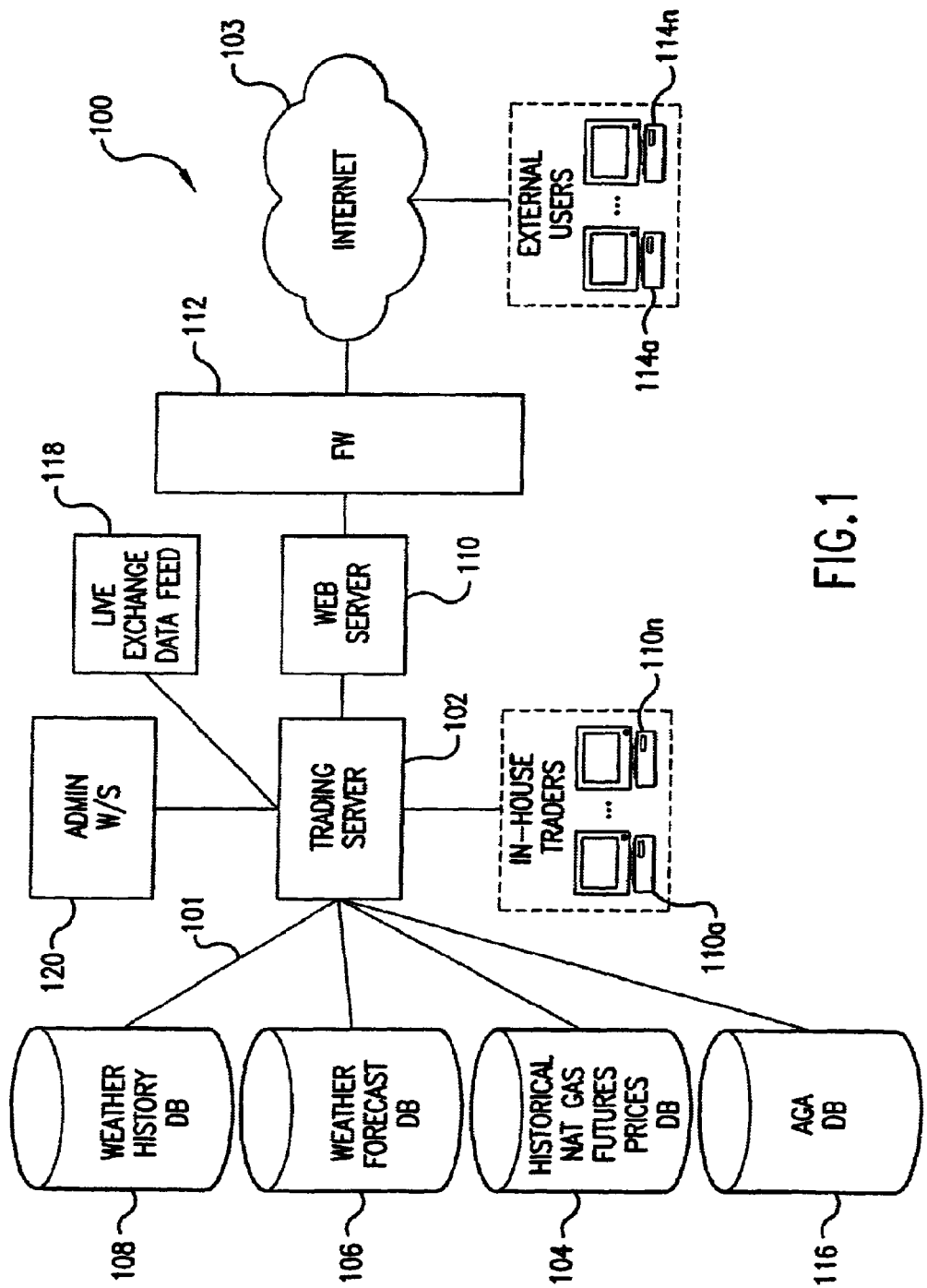
FIG. 1 is a block diagram representing the system architecture of an embodiment of the present invention.

Referring to FIG. 1, a natural gas trading system 100, according to an embodiment of the present invention, is shown. It should be understood that the particular trading system 100 in FIG. 1 is shown for illustrative purposes only and does not limit the invention. Other implementations for performing the functions described herein will be apparent to persons skilled in the relevant art(s) based on the teachings contained herein, and the invention is directed to such other implementations. As will be apparent to one skilled in the relevant art(s), all of components "inside" of the trading system 100 are connected and communicate via a communication medium such as a local area network (LAN) 101.

The trading system 100 includes a trading server 102 that serves as the "back-end" (i.e., processing system) of the present invention. Connected to the trading server 102, are gas databases 104 and 116, weather forecast database 106 and a weather history database 108. These databases are explained in more detail below. Also connected to trading system 100, as will be appreciated by those skilled in the relevant art(s), is a live data feed 118 of current gas contract prices available from a regulated exchange where such contracts are traded (e.g., NYMEX).

The trading server 102 is also connected to a Web server 110. As is well-known in the relevant art(s), a Web server is a server process running at a Web site which sends out Web pages in response to Hypertext Transfer Protocol (HTTP) requests from remote browsers. The Web server 110 serves as the "front end" of the present invention. That is, the Web server 110 provides the graphical user interface (GUI) to users of the trading system 100 in the form of Web pages. Such users may access the Web server 110 at the weather trading organization's site via a plurality of internal workstations 110 (shown as workstations 110a–n).

A firewall 112 (shown as "FW" 112) serves as the connection and separation between the LAN 101, which includes the plurality of network elements (i.e., elements 102–110 and 116–120) "inside" of the LAN 101, and the global Internet 103 "outside" of the LAN 101. Generally speaking, a firewall—which is well-known in the relevant art(s)—is a dedicated gateway machine with special security precaution software. It is typically used, for example, to service Internet 103 connections and dial-in lines, and protects a cluster of more loosely administered machines hidden behind it from an external invasion.

The global Internet 103, outside of the LAN 101, includes a plurality of external workstations 114 (shown as workstations 114a–n). The external workstations 114 allow client-users (traders) of the trading organization to remotely access and use the trading system 100.

The trading system 100 includes an administrative workstation 120 that may be used by the trading organization to update, maintain, monitor, and log statistics related to the server 102 and the trading system 100 in general. While one trading server computer 102 is shown in FIG. 1, it will be apparent to one skilled in the relevant art(s) that trading system 100 may be run in a distributed fashion over a plurality of the above-mentioned network elements connected via LAN 101. Similarly, while several databases (i.e., 104 and 116, 106, and 108) are shown in FIG. 1, it will be apparent to one skilled in the relevant art(s) that trading system 100 may utilize databases physically located on one or more computers which may or may not be the same as sever 102. More detailed descriptions of the trading system 100 components, as well as their functionality, are provided below.

B. Weather History Database

An example weather history database 108 is shown in FIG. 2. The weather history database 108 is described in detail in a commonly-owned U.S. Pat. No. 5,832,456 incorporated herein by reference in its entirety. For completeness, however, the weather history database 108 is briefly described herein. The weather history database 108 includes, for each year in the view, one or more records for each metropolitan area (MA). (The term MA closely resembles the well known name Metropolitan Statistical Area (MSA). However MA encompasses a larger surrounding geographical area/region than the strict MSA definition.) (However, since MA and MSA are similar, they are used interchangeably herein.) The weather history database 108 contains but is not limited to data on metropolitan areas. These records contain information specifying the weather that occurred in the subject MA in the time span represented in the view. Specifically, for each MA, there is a record for each of several weather data types.

In an embodiment of the present invention, there are three classes of weather data types in the weather history database 108—seasonal, actual, and category (also called weather pattern). A seasonal data type is the seasonal (or average) value of a weather parameter. Accordingly, the data type "temp.sea" is the average temperature. The data type "snow.sea" is the average snowfall. The data type "prec.sea" is the average precipitation.

An actual data type is the actual value of a weather parameter. Accordingly, the data type "temp" is the actual temperature. The data type "snow" is the actual snowfall. The data type "prec" is the actual precipitation.

A category data type reflects a weather parameter's actual versus seasonal values. Accordingly, the data type "temp.cat" reflects actual temperature versus seasonal temperature. The data type "prec.cat" reflects actual precipitation versus seasonal precipitation. If a category data type is equal to 1, then the actual value was greater than the seasonal value. If a category data type is equal to 0, then the actual value was equal to (or substantially corresponded to) the seasonal value. If a category data type is equal to −1, then the actual value was less than the seasonal value. Of course, values other than 1, 0, and −1 could be alternatively used to indicate these relationships. Also, other weather data types may be used.

The historical weather information in the weather history database 108 is provided on a per period basis. As indicated above, the period may be any increment of time, such as daily, weekly, bi-weekly, monthly, bimonthly, quarterly, etc. Preferably, the increment of time represented by a period is the same in both of the weather databases (106 and 108) within trading system 100.

Each weather pattern includes one or more weather parameters. For example, the temperature weather pattern includes the temperature parameter and the seasonal parameter. For any given period, each parameter can be either seasonal, below seasonal, or above seasonal. For any given period, the values of these weather patterns are represented by the entries (see records 202–205 in FIG. 2) in the weather history database 108 having the category data type. This file is used as the "look up" to allow the system to determine which patterns it will use.

C. Weather Forecast Database

An example weather forecast database 106 is shown in FIG. 3. The weather forecast database 106 is described in detail in the commonly-owned U.S. Pat. No. 5,832,456 incorporated herein by reference in its entirety. For completeness, however, the weather forecast database 106 is briefly described herein. The weather forecast database 106 includes, for each future year in the view, one or more records for each MA. These records (e.g., records 302–304) contain information specifying the weather that is predicted to occur in the subject MA in the future time span represented in the view. Specifically, for each MA, there is a record for each of several weather data types.

Similar to weather history database 108, weather forecast database 106 contains three classes of weather data types—seasonal, actual and category. These categories are the same as those described above with respect to the weather history database 108. Accordingly, the description above of the weather history database 108 also applies to the weather forecast database 106.

D. Relationship between Past and Future Databases

As evident by the description above, the weather history database 108 is a past database because it contains historical information. In contrast, the weather forecast database 106 is a future database because it contains information pertaining to predicted weather in the future, or future weather.

Both databases contain information on a per period basis. Preferably, the increment of time represented by a period is the same in both databases. Also, the periods in both databases are synchronized. Suppose that the increment of time is set equal to one month in an administration setup process using administration workstation 120. In this example, if it is assumed that period P1 represents January, then in weather history database 108, period P1 represents January of a past year. Similarly, in the weather forecast database 106, period P1 will represent January of a future year.

Further, in an embodiment of the present invention, both databases 106 and 108 would contain MA weather data for at least two specific "baskets of cities." For example, during the heating season (October–April), a basket of cities containing weather data for New York, Kansas City, Chicago and Pittsburgh would be of most interest to the operation of trading system 100 as will be explained in more detail below. Further, during the cooling season (May–September), for example, a basket of cities containing weather data for New York, Dallas, Houston, New Orleans, and Miami would be of most interest to the operation of trading system 100 as will be explained in more detail below.

In one embodiment of the present invention, the individual cities which are included in the heating and cooling season basket of cities would be those chosen by, but not limited to, the United States Department of Energy in their energy demand analyses.

E. Time Periods

As discussed above, data may be stored in the weather history database 108 using any time increment or period, including but not limited to daily, weekly, monthly, quarterly, etc. Similarly, weather forecast information for each location may be stored in the weather forecast database 106 on a daily basis, a weekly basis, a monthly basis, or a quarterly basis. Preferably, the time increment/period is the same in both databases 108 and 106. In practice, a system administrator will select the time increment(s)/period(s) during an administrator setup process using administration workstation 120 in order to meet the demands of traders using the plurality of workstations 110 and 114.

F. Gas Databases

The gas databases 104 and 116 contain the data that is used by the trading server 102 that are relevant in determining the complex buying/hedging decisions for which users will employ trading system 100.

In a preferred embodiment, gas database 104 would include historical natural gas futures price information. That is, database 104 would include the daily high, low and closing prices for each month's gas contracts for a historical time period (e.g., the previous five years). That is, for a particular historical date (e.g., Dec. 1, 1994), database 104 would contain that date's high, low and closing price for each month's contract going forward twelve months (i.e., January contract through December contract for 1995). An example gas database 104 is shown in FIG. 8.

In a preferred embodiment, database 116 would include historical American Gas Association (AGA) inventory information. The AGA is a natural gas industry trade association, currently based in Alexandria, Va. The AGA conducts technical research and helps create standards for equipment and products involved in every facet of the natural gas industry. It also compiles statistics which are considered industry standards. One such statistic is the weekly inventory of natural gas, measured in cubic feet, currently found in each of three regions of the United States: (1) the Producing Region (i.e., the gulf coast); (2) the Consuming East Region (i.e., east of the Rocky Mountains); and (3) the Consuming West Region (i.e., west of the Rocky Mountains). Thus, database 116 would include the 52 weekly measurements for each of three regions for a historical time period (e.g., the previous five years). Database 116 would also include the most currently available AGA inventory information (i.e., contain inventory data up to the present week). An example gas database 116 is shown in FIG. 7.

In an embodiment of the present invention, during the operation of trading system 100, the AGA inventory data in database 116 for the three regions are correlated with the weather data in databases 106 and 108 for the basket of cities discussed above.

As will be appreciated by one skilled in the relevant art(s), the gas databases 104 and 116 may include additional financial information on an application specific basis.

III. General System Operation

Referring to FIG. 4A, a flowchart 400 representing the operation of trading system 100, according to an embodiment of the present invention, is shown. Flowchart 400 begins at step 402 with control passing immediately to step 404.

In step 404, the user (e.g., gas buyer) enters the number of contracts they require for each of the twelve months going forward. The user would input this information based on the estimated consumption demand of the entity whose interest they represent.

In step 406, both the historical weather database 108 and AGA database 116 are read so that the trading server 102 has the correct information for processing. More specifically, the trading server 102 would query the AGA database 116 for the historical AGA natural gas inventory information for the relevant time period (e.g., starting at the present date and going backwards for a one-year period).

Also, in step 406, the trading server 102 would query the weather history database 108 (or obtain the information from some other source, such as a commercial service or governmental agency) for historical temperature information for each of the cities located in the cooling and heating season basket of cities, as applicable. Such historical weather would date back, in one embodiment, at least five years.

In an embodiment of the present invention, during the operation of trading system 100 (i.e., step 406 and step 410 described below), the weather data (e.g., daily average temperature) for the individual cities which are included in the heating and cooling season basket of cities can be equally considered, or weighted according to population, perception (e.g., weighing weather data for New York more heavily than the other cities in the basket because of NYMEX's location), etc.

After the completion of step 406, flowchart 400 may proceed to both steps 408 and 412.

In step 408, a first regression analysis is performed. In an embodiment of the present invention, linear regression is used. As will be appreciated by those skilled in the relevant art(s), linear regression, an example of multi-variate modeling techniques, is useful when using several variables to predict the values of a single continuous dependent variable. In general, regression generates exact coefficients for each predictor, and shows what proportion of the variability of the dependent variable is uniquely explained by each individual predictor and a measure of volatility (standard deviation). This makes it possible to build a predictive model.

In alternative embodiment, other non-linear regression analysis (e.g., curvilinear regression, loglinear analysis, etc.) may be employed. These analysis techniques are well-known in the relevant art(s), and are described in detail, for example, in David G. Kleinbaum et al., *Applied Regression Analysis and Other Multivariable Methods*, Duxbury Press (3rd. ed. 1998), ISBN 0534209106, which is hereby incorporated by reference in its entirety.

The regression of step 408 uses the historical weather and AGA inventory data read in step 406 in order to obtain an estimate for AGA inventory change. Mathematically, step 408 can be represented as follows. First, EQUATION (1) is the standard equation of a line (i.e., the linear equation):

$$y = m_1 x + b; \quad (1)$$

where $m_1$ is the slope and b is the y-axis intercept of the line. Using the AGA inventory data as the y-axis, and the historical weather (i.e., temperature) data as the x-axis, the linear regression of step 408 produces a straight line from the data points and determines $m_1$.

In step 412, the historical natural gas futures prices database 104 is read. This allows, in step 414, a three-dimensional (multi-variate) regression analysis to be performed. The regression of step 414 uses the historical gas contract prices data as the y-axis, historical weather data as the x-axis, and historical AGA inventory data as the z-axis, in order to obtain an estimate of each month's contract. Mathematically, this can be represented by EQUATION (2):

$$y = m_1 x_1 + m_2 x_2 + b; \quad (2)$$

where y is the price of the contract, $m_1$ is the AGA inventory, $x_1$ is the historical AGA inventory data, $x_2$ is the historical weather data, b is the y-axis intercept. Step 414 produces a straight line from the data points. In addition, step 414 generates a measure of price volatility (i.e., standard deviation) used later in the process in applying the recommendation rules (see TABLE 2).

In step 410, the weather forecast database 106 is read. This allows, in step 416, the result of both steps 408 and 414 to be used to obtain a predicted closing value (i.e., a "baseline"). EQUATION (2) is used to compute the baseline value (i.e., solving for y—the baseline), where $x_2$ is substituted by future weather and the y from EQUATION (1) becomes $x_1$.

In step 418, the live exchange data 118 is read. In step 420, a series of recommendation rules (i.e., conditions) are applied to arrive at an action recommendation in step 422. Flowchart 400 then ends as indicated by step 424.

In an embodiment of the present invention, the series of recommendation rules applied in step 420 to the baseline values are summarized in TABLE 2 below. The rules appear in the "if (condition) recommendation" pseudo-code notation.

TABLE 2

Inputs:  B = baseline value obtained in step 416
         F = current future's price obtained in step 418
         δ = standard deviation obtained from the regression analysis of step 414
Output:

Using EQUATION (3):
$$n = \frac{F - B}{\sigma} = \text{number of } \delta\text{'s away from baseline};$$

then the recommendation rules are applied as follows:
if(n > n₁)
    Strong Sell;
else if(n > n₂)
    Sell;
else if(n > n₃)
    Write a Put;
else if(n > n₄)
    Buy a Call;
else if(n > n₅)
    Buy;
else
    Strong Buy;
where $n_1 = 1.0$, $n_2 = 0.5$, $n_3 = 0$, $n_4 = -0.5$, and $n_5 = -1.0$.

In TABLE 2, the values $n_1$ to $n_5$ are examples used in a preferred embodiment of the present invention. In essence, EQUATION (3) converts prices into standard deviations. Thus, the further away n is from the baseline, the stronger the recommendation signal. The values of $n_1$ to $n_5$, can be subjectively varied based on the observations of the trading organization and the specific implementation of the predictive model used in the price analysis. As will be apparent to one skilled in the relevant art(s), various analysis of historical natural gas prices as correlated with weather can be used to determine the values of $n_1$ to $n_5$ that yield the best recommendations.

In an embodiment of the present invention, as apparent from TABLE 2, one of six action recommendations are given to the users of the trading system 100. These recommendations are summarized in TABLE 3 below.

TABLE 3

| RECOMMENDATIONS | EXPLANATION/CONDITION |
| --- | --- |
| Strong Buy | This is a strong signal to buy a futures contract. Condition: the current futures price is well below the predicted closing price. |
| Buy | Buy a Futures contract. Condition: the current futures price is below the predicted closing price. |
| Buy a Call | Buy a Call option on the Futures contract for that month. When the option comes due, the user will either exercise the option if the strike price is below the contract closing price. Otherwise the user will buy at the contract closing price. Condition: the current futures price is below or close to the predicted closing price. |
| Write a Put | Write (i.e., sell) a Put option on the Futures contract for that month. When the option comes due, the buyer of the option will sell the gas to the user if the market price is below the strike price. Otherwise the buyer will let the option expire and the user will buy at the contract closing price. Condition: the current futures price is above or close to the predicted closing price. |
| Sell | Sell a futures contract or buy natural gas at the index (i.e., closing) settlement price for that month. This can be done by just waiting and buying gas at the bid contract closing price, or the user can contact a supplier and notify |

TABLE 3-continued

| RECOMMENDATIONS | EXPLANATION/CONDITION |
| --- | --- |
| | them that the user will be buying natural gas at the contract index price for that month. Condition: the current futures price is above the predicted closing price. |
| Strong Sell | This is a strong signal to sell a futures contract or buy natural gas at the index settlement price for that month. Condition: the current futures price is well above the predicted closing price. |

Referring to FIG. 4B, flowchart 400, which represents the operation of trading system 100 according to one embodiment of the present invention, is shown in a control flow format. That is, FIG. 4B, as will be appreciated by one skilled in the relevant art(s), illustrates how the system 100 components interact during the operation of flowchart 400 according to one embodiment of the present invention.

IV. Graphical User Interface

In an embodiment of the present invention, trading server 102 will provide a GUI (as shown in FIG. 5) for users, such as the in-house traders using the plurality of workstations 110, to enter inputs and receive the outputs as described in flowchart 400. Further, trading server 102 in conjunction with the web server 110 will also provide a GUI to the plurality of external users on the workstations 114 to enter inputs and receive the outputs as described in flowchart 400.

A GUI screen 500 with the representative numbers is shown in FIG. 5. The GUI screen 500 includes a column 501 which labeled "days left" which indicated to the user the number of days until that particular month's contract expires. Screen 500 also includes a column 502 which indicates the month and year of the contract for which a particular row in the GUI screen contains information. A column 503 contains the current gas contract prices available from a regulated exchange where such contracts are traded (e.g., NYMEX) and obtained from live data feed 118. A column 504 contains the change in price for each contract from a past price (e.g., yesterday's closing price).

GUI screen 500 also includes a column 505 indicates the implied volatility of the contract's price. This is calculated, for example, using the Black-Scholes option pricing model. As is well-known in the relevant art(s), the Black-Scholes option pricing model, based on stochastic calculus, is the most influential and extensively used options pricing model and is described in detail in a variety of publicly available documents, such as Neil A. Chriss, *The Black-Scholes and Beyond Interactive Toolkit: A Step-by-Step Guide to In-depth Option Pricing Models*, McGraw-Hill (1997), ISBN: 078631026X, which is incorporated herein by reference in its entirety.

GUI screen 500 also includes a display 506 which indicates to the user the current (i.e., today's) date. A column 507 indicates, for each contract, one of the six recommendations trading system 100 outputs as explained above and detailed in TABLE 3. A column 508, when viewed in conjunction with the recommendation of column 507, indicates the number of each month's contract the user should act upon in accordance with the recommendation. This is calculated by trading system 100 by using the desired number of contracts the user inputted in step 404 described above with reference to FIG. 4A.

GUI screen 500 also includes a column 509 which displays, if the recommendation in column 207 relates to an option contract (i.e., a call or a put), the premium for the contract. As will be appreciated by those skilled in the relevant art(s), a premium is the up-front, non-refundable amount that a buyer pays a seller to obtain an option as determined competitively by buyers and sellers in open outcry trading on an exchange (e.g., NYMEX) trading floor.

GUI screen 500 also includes a column 510, which reflects the number of each contract the user desires as inputted in step 404 described above with reference to FIG. 4A. A column 511 reflects how many actual contracts the user has obtained to date. This number, if the user of trading system 100 uses it properly, should be equal to or less than the desired number of each month's contract appearing in column 510. Columns 512, 514, 516 and 518 are the number of futures, index, call, and put contracts, respectively, the user has obtained to date. The sum of the number of contracts appearing in columns 512, 514, 516 and 518 should equal the number of actual contracts appearing in column 511.

It should be understood that the control flow shown in FIGS. 4A–B and thus, GUI screen 500 shown in FIG. 5, are presented for example purposes only. The present invention is sufficiently flexible and configurable such that users (on the plurality of workstations 110 and/or 114) may navigate through the system 100 in ways other than that shown in the figures.

V. Environment

The present invention (i.e., natural gas trading system 100 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 600 is shown in FIG. 6. The computer system 600 includes one or more processors, such as processor 604. The processor 604 is connected to a communication infrastructure 606 (e.g., a communications bus, crossover bar, or network). Various software embodiments are described in terms of this exemplary computer system. After reading this description, it will become apparent to a person skilled in the relevant art(s) how to implement the invention using other computer systems and/or computer architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600. The invention is directed to such computer program products.

Computer programs (also called computer control logic) are stored in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A computer-based method for valuating natural gas futures and options contracts using weather-based metrics, comprising the steps of:
   (1) receiving, via a graphical user interface, an input from a user indicative of a number of monthly gas contracts desired for a period of time;
   (2) receiving, from a first database stored in a memory, historical weather information for at least one basket of cities during said period of time;
   (3) receiving, from a second database stored in said memory, future weather information for said at least one basket of cities during said period of time;
   (4) receiving, from a third database stored in said memory, historical natural gas inventory information for said at least one basket of cities during said period of time;
   (5) receiving, from a fourth database stored in said memory, historical gas futures contract price information for said period of time;
   (6) applying, at a server, a series of regression analyses to obtain a predicted baseline value for each of the monthly gas contracts within said period of time using said received historical weather information, said future weather information, said historical natural gas inventory information, and said historical gas futures contract price information;
   (7) receiving, from a data feed, live exchange data which indicates a current price for each of the monthly gas contracts within said period of time;
   (8) applying, at said server, a series of recommendation rules to said predicted baseline value, using said received live exchange data; and
   (9) providing, via said graphical user interface, said user with a recommendation for each of the monthly gas contracts within said period of time, wherein said recommendation reflects said input from said user indicative of said number of the monthly gas contracts desired for said period of time.

2. The method of claim 1, wherein said series of regression analyses applied in step (6), comprises the steps of:
   (a) performing, at said server, a linear regression of said historical weather information and said historical natural gas inventory information; and
   (b) performing, at said server, a multi-variate regression of said historical gas futures contract price information, said historical weather information and said historical natural gas inventory information.

3. The method of claim 1, wherein said series of recommendation rules provided in step (8) includes at least one of the following:
   (i) Strong Buy;
   (ii) Buy;
   (iii) Buy a Call;
   (iv) Write a Put;
   (v) Sell; and
   (vi) Strong Sell.

4. A system for valuating natural gas futures and options contracts using weather-based metrics, comprising:
   a weather history database that stores historical weather information for at least one basket of cities;
   a weather forecast database that stores future weather information for said at least one basket of cities;
   an inventory database that stores historical natural gas inventory information for at least said at least one basket of cities;
   a price database that stores historical natural gas futures prices information;
   at least one workstation that allows a user to specify inputs that affect a value of the natural gas futures and options contracts; and
   at least one trading server, responsive to said at least one workstation and connected to said weather history database, said weather forecast database, said inventory database, and said price database, that applies a pricing model to valuate the natural gas futures and options contracts using said specified inputs from said user;
   whereby the system provides assistance to said user in reaching buying/hedging decisions in trading the natural gas futures and options contracts.

5. A computer program product comprising a computer usable medium having computer readable program code means embodied in said medium for causing an application program to execute on a computer that performs valuations of natural gas futures and options contracts using weather-based metrics, said computer readable program code means comprising:
   first computer readable program code means for causing the computer to receive an input from a user indicative of a number of monthly gas contracts desired for a period of time;
   second computer readable program code means for causing the computer to receive historical weather information for at least one basket of cities during said period of time;
   third computer readable program code means for causing the computer to receive future weather information for said at least one basket of cities during said period of time;
   fourth computer readable program code means for causing the computer to receive historical natural gas inventory information for said at least one basket of cities during said period of time;
   fifth computer readable program code means for causing the computer to receive historical gas futures contract price information for said period of time;
   sixth computer readable program code means for causing the computer to apply a series of regression analyses to obtain a predicted baseline value for each of the monthly gas contracts within said period of time using said received historical weather information, said future weather information, said historical natural gas inventory information, and said historical gas futures contract price information;
   seventh computer readable program code means for causing the computer to receive live exchange data which indicates a current price for each of the monthly gas contracts within said period of time;
   eighth computer readable program code means for causing the computer to apply a series of recommendation rules to said predicted baseline value, using said received live exchange data; and
   ninth computer readable program code means for causing the computer to provide said user with a recommendation for each of the monthly gas contracts within said period of time, wherein said recommendation reflects said input from said user indicative of said number of the monthly gas contracts desired for said period of time.

6. The computer program product of claim 5, wherein said sixth computer readable program code means comprises:

tenth computer readable program code means for causing the computer to perform a linear regression of said historical weather information and said historical natural gas inventory information; and eleventh computer readable program code means for causing the computer to perform a multi-variate regression of said historical gas futures contract price information, said historical weather information and said historical natural gas inventory information.

* * * * *